(12) United States Patent
Mueller et al.

(10) Patent No.: US 8,415,760 B2
(45) Date of Patent: Apr. 9, 2013

(54) SENSOR FOR DETECTING THERMAL RADIATION

(75) Inventors: Thorsten Mueller, Reutlingen (DE); Ando Feyh, Tamm (DE)

(73) Assignee: Robert Bosch GmbH, Stuttgart (DE)

( * ) Notice: Subject to any disclaimer, the term of this patent is extended or adjusted under 35 U.S.C. 154(b) by 225 days.

(21) Appl. No.: 12/806,347

(22) Filed: Aug. 10, 2010

(65) Prior Publication Data

US 2011/0057285 A1  Mar. 10, 2011

(30) Foreign Application Priority Data

Sep. 10, 2009 (DE) .......................... 10 2009 029 343

(51) Int. Cl.
*H01L 29/66* (2006.01)

(52) U.S. Cl.
USPC .... 257/467; 257/433; 257/184; 257/E29.347; 257/E21.002; 438/48; 438/54; 438/55

(58) Field of Classification Search .................. 257/467, 257/E29.347, E21.002, 440, 184, 433; 438/48, 438/54, 55

See application file for complete search history.

(56) References Cited

U.S. PATENT DOCUMENTS

| | | | | |
|---|---|---|---|---|
| 5,659,195 A | * | 8/1997 | Kaiser et al. | ................ 257/415 |
| 5,808,350 A | * | 9/1998 | Jack et al. | ................ 257/440 |
| 6,252,229 B1 | * | 6/2001 | Hays et al. | ................ 250/338.4 |
| 6,329,655 B1 | * | 12/2001 | Jack et al. | ................ 250/338.1 |
| 2009/0102003 A1 | * | 4/2009 | Vogt et al. | ................ 257/433 |

FOREIGN PATENT DOCUMENTS

DE        103 15 964        10/2004

* cited by examiner

*Primary Examiner* — Thinh T Nguyen
(74) *Attorney, Agent, or Firm* — Kenyon & Kenyon LLP

(57) ABSTRACT

A sensor having a monolithically integrated structure for detecting thermal radiation includes: a carrier substrate, a cavity, and at least one sensor element for detecting thermal radiation. Incident thermal radiation strikes the sensor element via the carrier substrate. The sensor element is suspended in the cavity by a suspension.

4 Claims, 5 Drawing Sheets

SENSOR FOR DETECTING THERMAL RADIATION

BACKGROUND OF THE INVENTION

1. Field of the Invention

The present invention relates to a sensor for detecting thermal radiation as well as a method for manufacturing such a sensor.

2. Description of Related Art

Published German patent document DE 103 15 964 A1 describes a device for detecting radiation signals in the infrared range, a sensor element and a filter element being monolithically integrated into this device.

BRIEF SUMMARY OF THE INVENTION

An object of the present invention is to provide a sensor having a monolithically integrated design for detecting thermal radiation, for example, infrared radiation, including a carrier substrate (carrier wafer), a cavity and at least one sensor element for detecting thermal radiation, for example, infrared radiation, incident thermal radiation striking the sensor element via the carrier substrate and the sensor element being suspended in the cavity via a suspension.

A sensor having such a structure has the advantage that the incident radiation is sensed not via the cap but instead via the carrier substrate, i.e., from the back, so that interfering influences of capping processes, for example, grain boundaries in the cap layer, may be avoided. Heat loss by the sensor element to the environment may also be reduced through the suspension of the sensor element in the cavity.

Within the scope of one example embodiment of the present invention, the sensor element is suspended at a distance from the walls of the cavity.

Within the scope of another example embodiment of the present invention, electrical contacts are used for electrical contacting of the sensor element as a suspension. This has the advantage that no additional components are needed for implementing the suspension, the total space required thus being minimized and the manufacturing method simplified.

The sensor preferably includes a plurality of sensor elements (sensor element array).

Within the scope of another example embodiment of the present invention, the sensor element is selected from the group including temperature-sensitive diodes and resistive bolometers, in particular polycrystalline silicon resistors.

Within the scope of another example embodiment of the present invention, a pressure of a few mbar, for example, $\geq 0.01$ mbar to $\leq 100$ mbar, is enclosed in the cavity.

A sensor according to the present invention may be a sensor manufactured using a method according to the present invention, as explained below.

With regard to additional features and advantages of a sensor according to the present invention, reference is herewith explicitly made to the following explanations in conjunction with the method according to the present invention for manufacturing sensors having a monolithically integrated structure for detecting thermal radiation.

Another object of the present invention is to provide a method for manufacturing a sensor having a monolithically integrated structure for detecting thermal radiation, for example, infrared radiation, in particular for manufacturing a sensor according to the present invention as already explained above, including the following method steps:

a) depositing and structuring of a first sacrificial layer on a carrier substrate (carrier wafer), b) depositing and structuring of at least one sensor element for detecting thermal radiation, for example, infrared radiation, on the first sacrificial layer, c) depositing and structuring of a second sacrificial layer on the sensor element and the first sacrificial layer, d) depositing and structuring of a cap layer on the second sacrificial layer, e) forming electrical contacts for contacting the sensor element, f) forming at least one access opening for etching the sacrificial layers, g) etching the sacrificial layers, forming a cavity, and h) closing the access opening.

A method according to the present invention may also have the advantage that sensors having a very low internal pressure in the cavity may be produced thereby.

The crystal structure of the carrier substrate is preferably preserved during a method according to the present invention.

Method step e) may fundamentally be performed either before or after or simultaneously with method step f).

Within the scope of another example embodiment of the present invention, the method also includes method step b'): depositing and structuring of an absorber layer on a sensor element. In method step c), the second sacrificial layer may be deposited and structured on the absorber layer, on the first sacrificial layer, and optionally on the sensor element.

Within the scope of a further example embodiment of the present invention, the electrical contacts are formed in method step e) as the suspension for suspending the sensor element in the cavity created in method step g). As already explained, this has the advantage that no additional components are required for implementing a sensor element suspension, and thus the entire space required may be minimized and the manufacturing method may be simplified. As already explained, a sensor element suspension as such again has the advantage that heat loss by the sensor element to the environment may be reduced.

Within the scope of a further example embodiment of the present invention, electrical contacts in the form of through-contacts from the sensor surface through the cap layer and through the second sacrificial layer to the sensor element are formed in method step e).

Within the scope of a further example embodiment of the present invention, the electrical contacts are formed in method step e) by forming contact openings, for example, with the aid of a trench process, then forming insulating contact opening walls, for example, with the aid of a thermal oxidation process, in particular the local contact opening through directed oxide etching on the bottom of the through-contact and then filling the contact openings with an electrically conductive material, for example, doped polycrystalline silicon with the aid of a deposition process, for example.

The carrier substrate may be formed from a material having a high resistance to ensure good permeability for infrared radiation. Within the scope of a further specific embodiment of the present invention, the carrier substrate includes a material having a specific electrical resistivity of more than 10 $\Omega$cm, for example, $\geq 12$ $\Omega$cm to $\leq 18$ $\Omega$cm. The carrier substrate may in particular be made of a material having a specific electrical resistivity of more than 10 $\Omega$cm, for example, $\geq 12$ $\Omega$cm to $\leq 18$ $\Omega$cm.

Within the scope of a further example embodiment of the present invention, the first sacrificial layer and the second sacrificial layer include silicon germanium (SiGe) and/or silicon oxide. The first sacrificial layer and the second sacrificial layer may be made of silicon germanium (SiGe) and/or silicon oxide in particular. The first sacrificial layer may be made in particular of epitaxial (single-crystal) silicon germanium. However, the second sacrificial layer need not necessarily be made of epitaxial silicon germanium.

Within the scope of a further example embodiment of the present invention, the sensor element includes silicon germanium (SiGe), in particular doped silicon germanium and/or doped polycrystalline silicon (polysilicon). The sensor element may be made of silicon germanium (SiGe), in particular doped silicon germanium and/or doped polycrystalline silicon (polysilicon).

Within the scope of a further example embodiment of the present invention, the absorber layer, in particular in the case of a sacrificial layer of silicon germanium, includes an oxide, in particular silicon oxide. The absorber layer may be made of an oxide in particular, for example, silicon oxide.

Within the scope of a further example embodiment of the present invention, the cap layer includes epitaxial silicon. The cap layer may be made of epitaxial silicon in particular. The cap layer may have a layer thickness of $\geqq 10$ μm to $\leqq 30$ μm. The cap layer preferably exhibits polycrystalline growth in the region above the sensor element(s) and monocrystalline growth on the carrier substrate in the region next to the sensor element(s). This may advantageously permit implementation of an ASIC next to the sensor (monolithic integration).

Within the scope of a further example embodiment of the present invention, the electrical contacts include doped polycrystalline silicon. The electrical contacts may be formed from doped polycrystalline silicon in particular.

In the case of a sacrificial layer of silicon germanium, $ClF_3$ may be used as the etchant. In the case of a silicon oxide sacrificial layer, hydrogen fluoride may be used as the etchant.

The access opening may be closed in method step h) by nonconforming deposition, in which a process pressure of a few mbar may advantageously be enclosed in the cavity.

Within the scope of a further example embodiment, a pressure of a few mbar, for example, $\geqq 0.01$ mbar to $\leqq 100$ mbar, may be enclosed in the cavity in method step h) when closing the access opening.

With regard to additional features and advantages of methods according to the present invention for manufacturing sensors having a monolithically integrated structure for detecting thermal radiation, explicit reference is made to the explanations in conjunction with sensors according to the present invention having a monolithically integrated structure for detecting thermal radiation.

A further object of the present invention is to provide a sensor having a monolithically integrated structure for detecting thermal radiation, for example, infrared radiation, manufactured by a method according to the present invention.

DETAILED DESCRIPTION OF THE INVENTION

Figure 1:
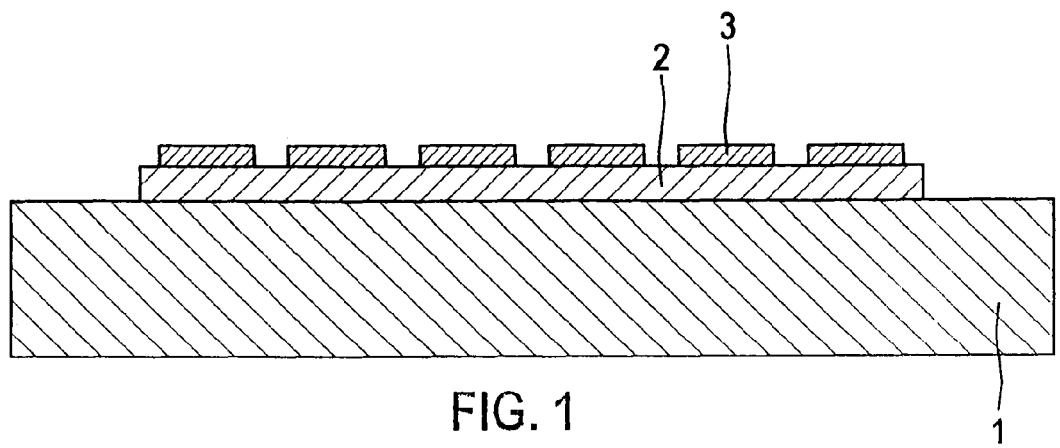
FIG. 1 shows a cross-sectional view of the structure of a sensor according to the present invention after completion of method step b).

FIG. 1 illustrates that in method step a), a first sacrificial layer 2 is deposited on a carrier substrate 1 and structured, and in method step b), six sensor elements 3 for detecting thermal radiation are deposited on first sacrificial layer 2 and structured.

Figure 2A:
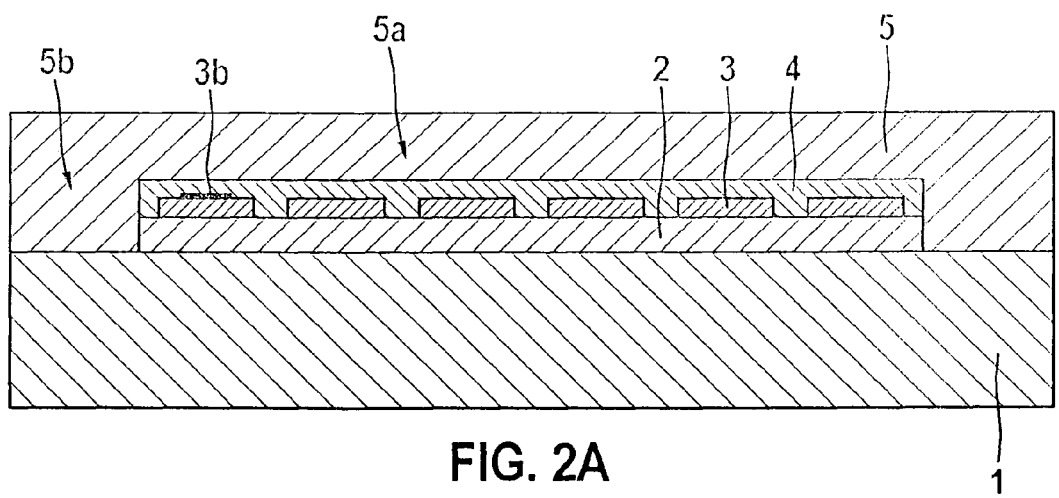
FIG. 2a shows the structure of a sensor according to the present invention having resistive bolometers as sensor elements after completion of method step d).

FIG. 2a illustrates that in method step c) a second sacrificial layer 4 is deposited and structured on sensor elements 3, designed in the form of resistive bolometers, and on first sacrificial layer 2, and that in method step d) a cap layer 5 is deposited and structured on second sacrificial layer 4.

Figure 2B:
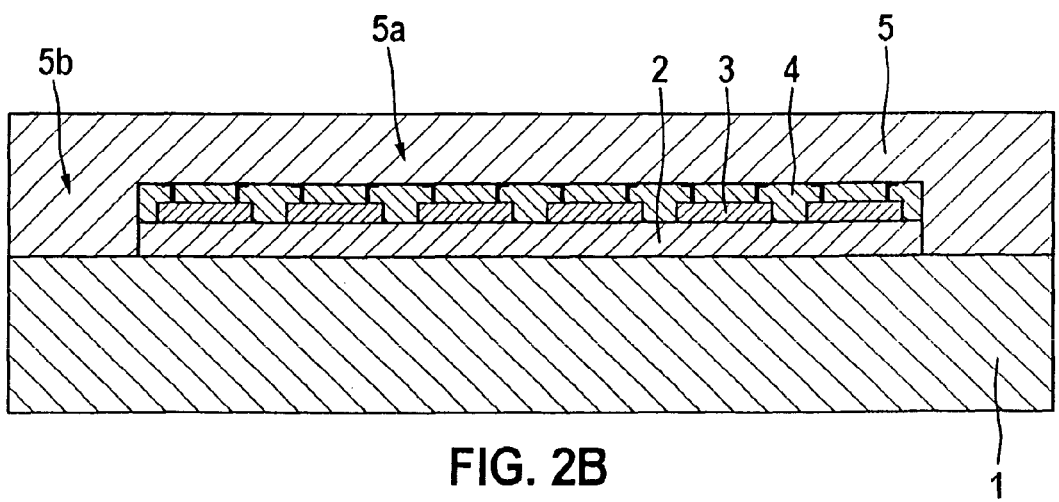
FIG. 2b shows the structure of a sensor according to the present invention having temperature-sensitive diodes as sensor elements after completion of method step d).

FIG. 2b illustrates that in method step c) a second sacrificial layer 4 is deposited and structured on sensor elements 3, designed in the form of temperature-sensitive diodes, and on first sacrificial layer 2, and that in method step d) a cap layer 5 is deposited and structured on second sacrificial layer 4.

FIGS. 2a and 2b also illustrate that cap layer 5 exhibits polycrystalline growth in region 5a above sensor elements 3 and exhibits monocrystalline growth on carrier substrate 1 in region 5b next to sensor elements 3, which advantageously allows the implementation of an ASIC next to the sensor (monolithic integration).

Figure 2C:
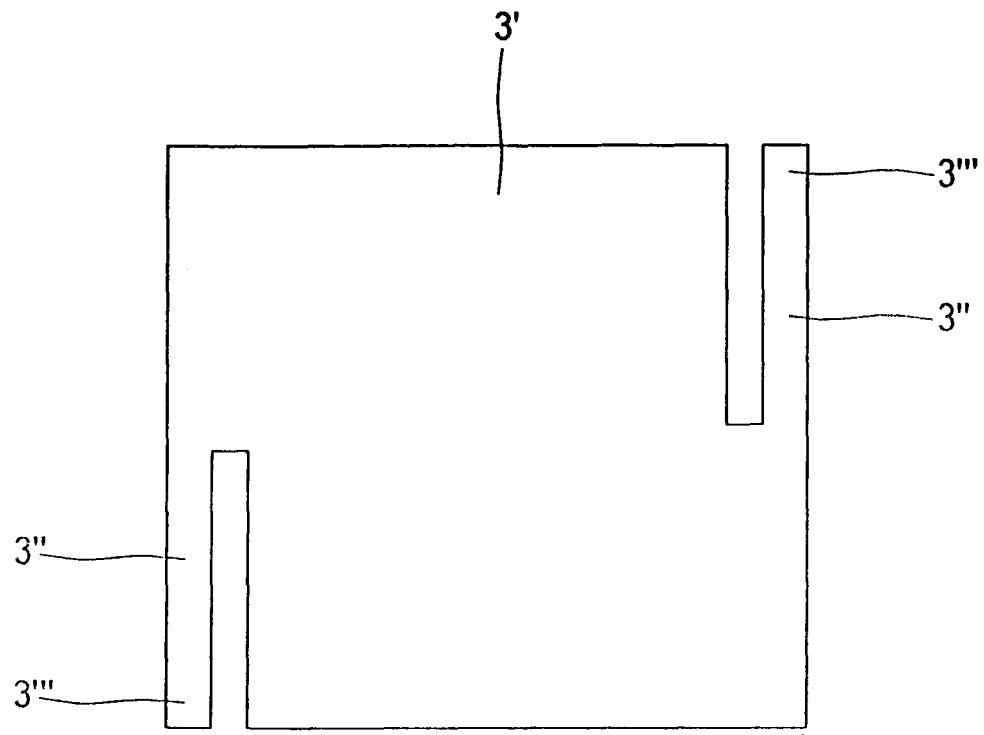
FIG. 2c shows a top view of a sensor element designed in the form of a resistive bolometer.

FIG. 2c shows a top view of a design of a sensor element designed in the form of a resistive bolometer. FIG. 2c shows that sensor element 3 designed in the form of a resistive bolometer has a sensitive surface 3', feeder lines 3" for thermal isolation of sensitive surface 3' and terminal sites 3'" for electrical connection of through-contacts.

Figure 2D:
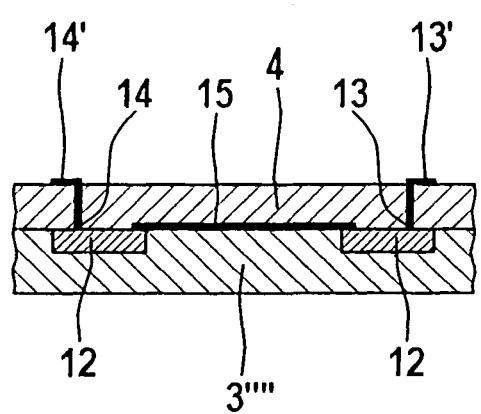
FIG. 2d shows a detailed view of a sensor element designed in the form of a temperature-sensitive diode.

FIG. 2d shows a detailed view of a sensor element designed in the form of a temperature-sensitive diode according to method step e). FIG. 2d shows that the sensor element designed in the form of a temperature-sensitive diode has a silicon element 3"", in particular a silicon block and a first electrical contact 13, 13' and second electrical contact 14, 14' passing through the second sacrificial layer. By etching away sacrificial layers 2, 4 in subsequent method step g), it is possible to achieve the result that electrical contacts 13', 14' then also function as the suspension for silicon element 3"" in resulting cavity 8 (cf. FIGS. 4b and 5b). Silicon element 3"" is preferably designed of n-doped epitaxial silicon. First electrical contact 13, 13' and second electrical contact 14, 14' are preferably designed of polycrystalline silicon. FIG. 2d shows that a p+ implantation and an n+ implantation 12 are introduced into silicon element 3"". When using a p+/n diode, the n+ implantation improves the electrical terminal resistance of second electrical contact 14, 14'. FIG. 2d also shows that the sensor element designed in the form of a temperature-sensitive diode on silicon element 3"" has an absorber layer 15.

Figure 3A:
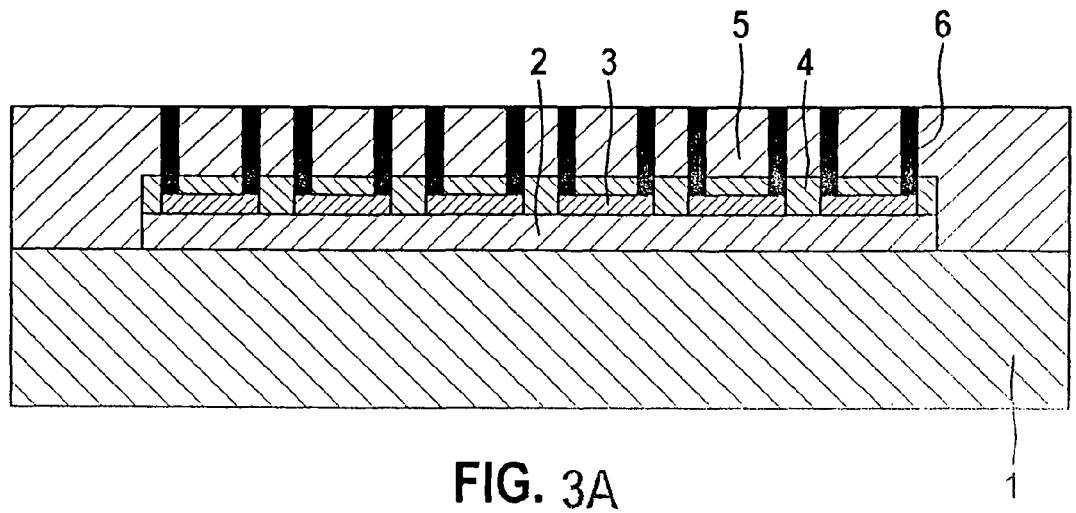
FIG. 3a shows the structure of a sensor according to the present invention having resistive bolometers as sensor elements after completion of method step e).

FIG. 3a illustrates the design of electrical contacts 6 for contacting sensor elements 3 designed in the form of resistive bolometers in method step e).

Figure 3B:
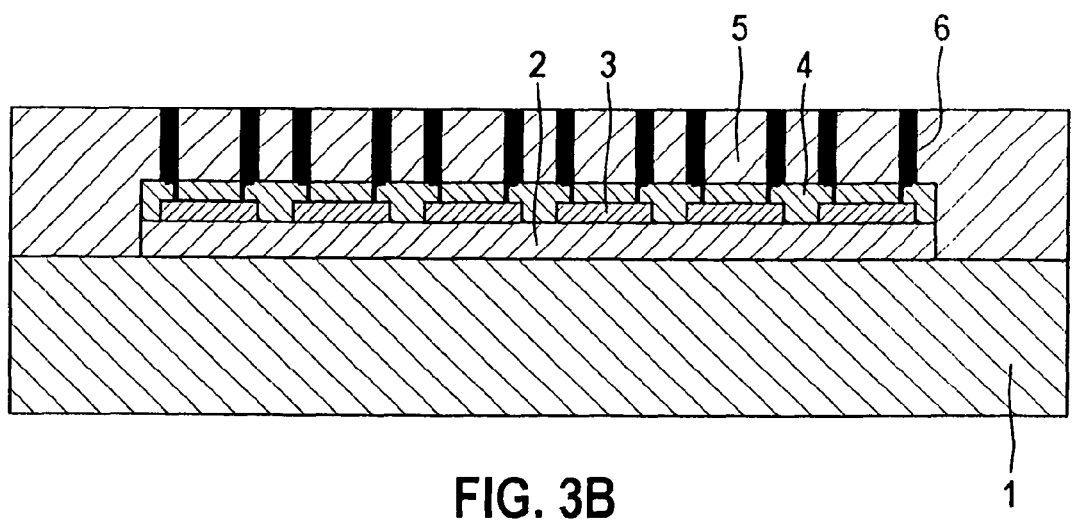
FIG. 3b shows the structure of a sensor according to the present invention having temperature-sensitive diodes as sensor elements after completion of method step e).

FIG. 3b illustrates the design of electrical contacts 6, 13', 14' for contacting sensor elements 3 designed in the form of temperature-sensitive diodes in method step e).

FIGS. 3a and 3b show that electrical contacts 6, 13', 14' are designed in the form of through-contacts from the sensor surface through cap layer 5 and through second sacrificial layer 4 to the particular sensor element 3.

Figure 4A:
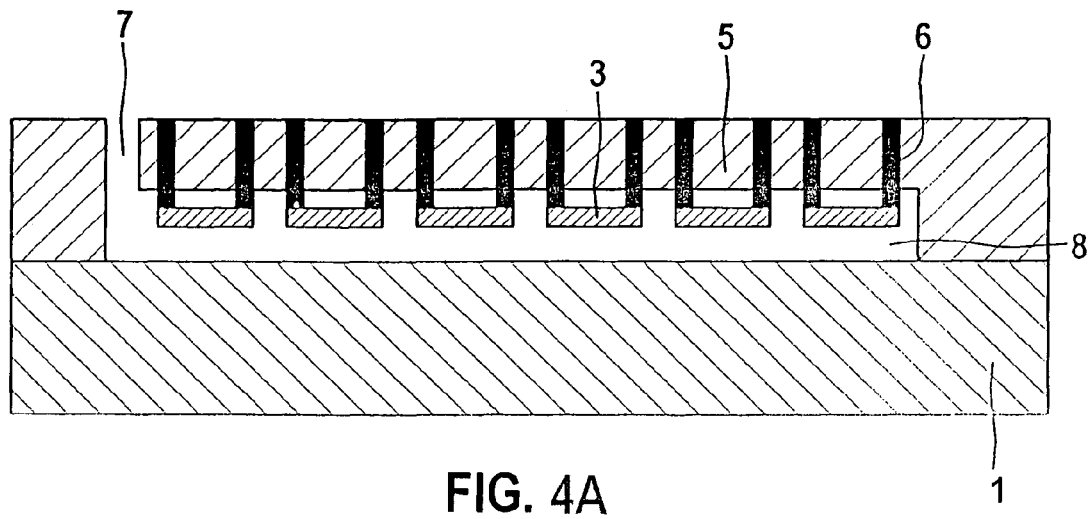
FIG. 4a shows the structure of a sensor according to the present invention having resistive bolometers as sensor elements after completion of method step g).

On the basis of a sensor having sensor elements 3 designed in the form of resistive bolometers, FIG. 4a shows the design of an access opening 7 for etching sacrificial layers 2, 4 in method step f) and subsequent etching of first sacrificial layer 2 and second sacrificial layer 4, forming a cavity 8 in method step g).

Figure 4B:
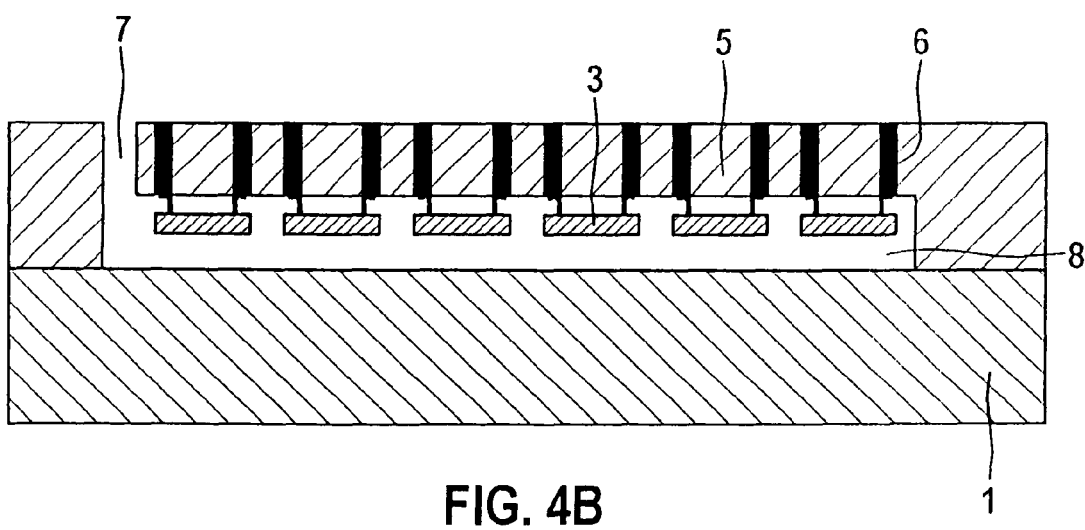
FIG. 4b shows the structure of a sensor according to the present invention having temperature-sensitive diodes as sensor elements after completion of method step g).

On the basis of a sensor having sensor elements 3 designed in the form of temperature-sensitive diodes, FIG. 4b shows the design of an access opening 7 for etching sacrificial layers 2, 4 in method step f) and subsequent etching of first sacrificial layer 2 and second sacrificial layer 4, forming a cavity 8 in method step g).

Figure 5A:
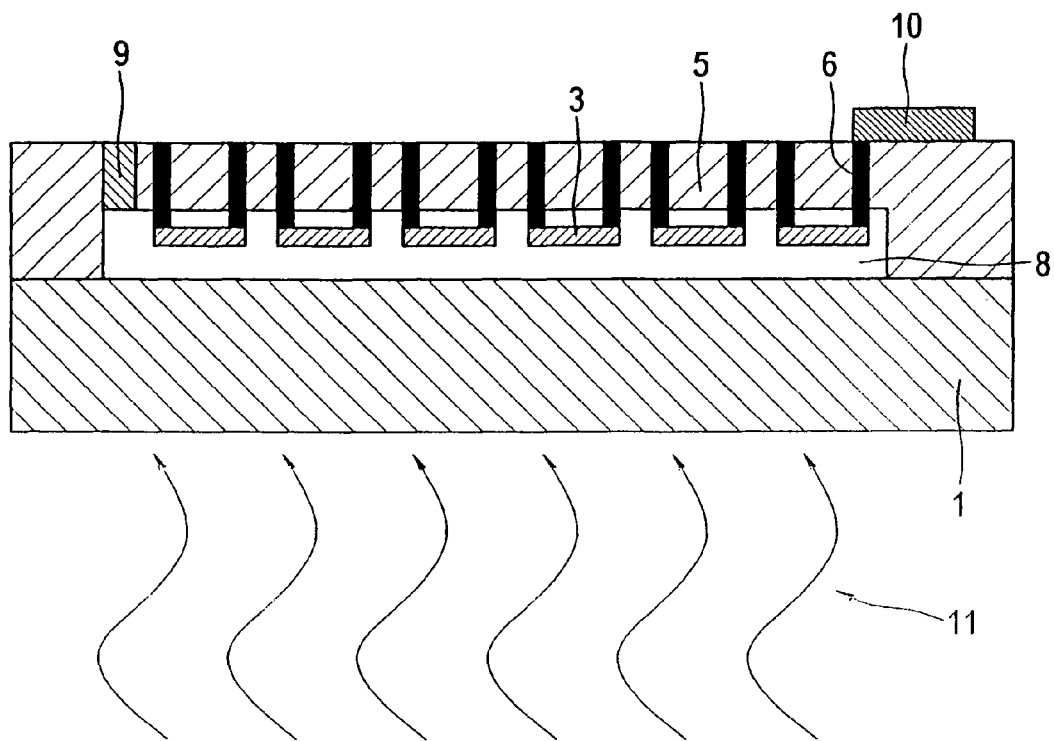
FIG. 5a shows the structure of a sensor according to the present invention having resistive bolometers as sensor elements after completion of method step h).

On the basis of a sensor having sensor elements 3 designed in the form of resistive bolometers, FIG. 5a shows that access opening 7 is closed in method step h).

Figure 5B:
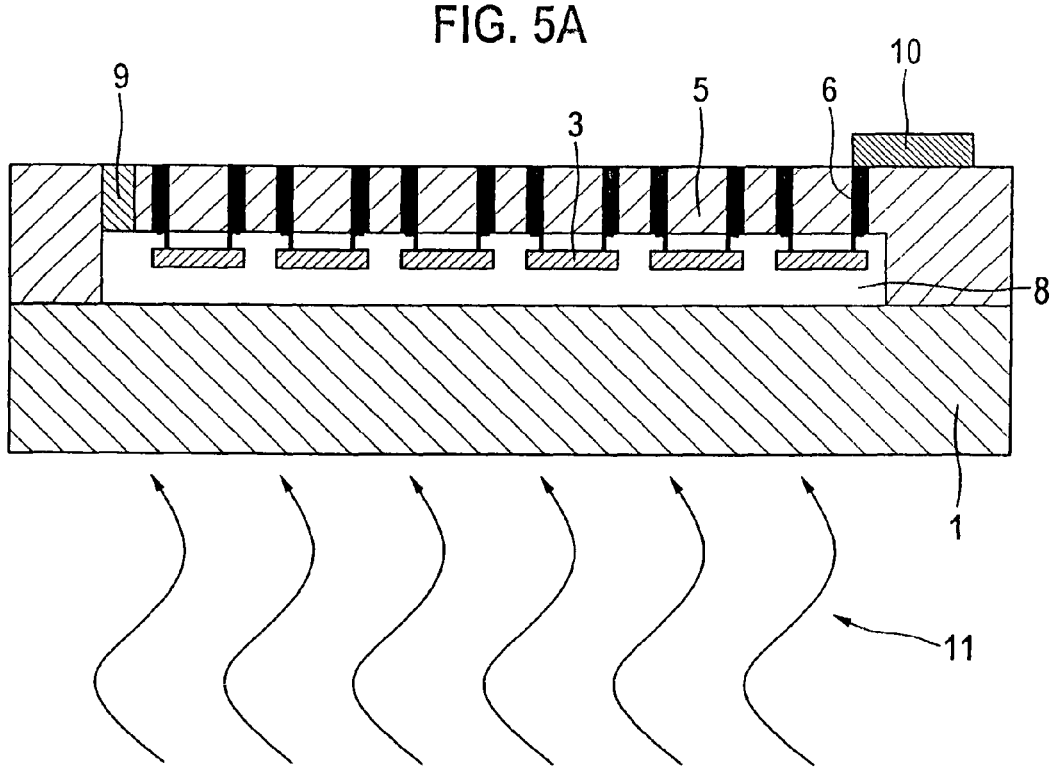
FIG. 5b shows the structure of a sensor according to the present invention having temperature-sensitive diodes as sensor elements after completion of method step h).

On the basis of a sensor having sensor elements 3 designed in the form of temperature-sensitive diodes, FIG. 5b shows that access opening 7 is closed in method step h).

FIGS. 5a and 5b show in particular finished sensors according to the present invention having a monolithically integrated structure for detecting thermal radiation. FIGS. 5a and 5b show that these sensors include a carrier substrate 1, a cavity 8 and multiple sensor elements 3 for detecting thermal radiation, sensor elements 3 being suspended via suspensions 6, 13', 14' in cavity 8 at a distance from the walls of cavity 8. Electrical contacts 6, 13', 14' for electrical contacting of sensor elements 3 are provided as a suspension. FIGS. 5a and 5b also show that incident thermal radiation 11 strikes sensor elements 3 via carrier substrate 1, and sensor elements 3 detect incident thermal radiation 11 through carrier substrate 1.

What is claimed is:

1. A sensor having a monolithically integrated structure for detecting thermal radiation, comprising:
 a carrier substrate;
 a cavity; and
 at least one sensor element for detecting thermal radiation;
 wherein incident thermal radiation strikes the sensor element via the carrier substrate, wherein the sensor element is suspended in the cavity by a suspension, and wherein only electrical contacts for electrical contacting of the sensor element are used as the suspension.

2. The sensor as recited in claim 1, wherein the sensor element is suspended at a distance from the walls of the cavity.

3. The sensor as recited in claim 2, wherein the sensor element is selected from the group including temperature-sensitive diodes and resistive bolometers.

4. The sensor as recited in claim 2, wherein a pressure in the range of 0.01 mbar to 100 mbar is enclosed in the cavity.

* * * * *